United States Patent
Pfeffer et al.

(10) Patent No.: US 7,539,193 B2
(45) Date of Patent: May 26, 2009

(54) SYSTEM AND METHOD FOR FACILITATING COMMUNICATION BETWEEN A CMTS AND AN APPLICATION SERVER IN A CABLE NETWORK

(75) Inventors: Howard L. Pfeffer, Reston, VA (US); Kenneth Gould, Herndon, VA (US)

(73) Assignee: Time Warner Cable, Inc., Stamford, CT (US)

( * ) Notice: Subject to any disclaimer, the term of this patent is extended or adjusted under 35 U.S.C. 154(b) by 746 days.

(21) Appl. No.: 11/044,964

(22) Filed: Jan. 27, 2005

(65) Prior Publication Data

US 2006/0165082 A1 Jul. 27, 2006

(51) Int. Cl.
- H04L 12/26 (2006.01)
- H04J 3/14 (2006.01)
- G08C 15/00 (2006.01)
- G06F 11/00 (2006.01)

(52) U.S. Cl. ............... 370/392; 370/235; 370/389; 709/220

(58) Field of Classification Search ......... 370/229–338, 370/389–411; 709/220–228, 232–245; 725/25–111
See application file for complete search history.

(56) References Cited

U.S. PATENT DOCUMENTS

| | | | |
|---|---|---|---|
| 6,693,878 B1 * | 2/2004 | Daruwalla et al. | 370/235 |
| 6,839,829 B1 * | 1/2005 | Daruwalla et al. | 712/28 |
| 7,058,007 B1 * | 6/2006 | Daruwalla et al. | 370/216 |
| 7,107,326 B1 * | 9/2006 | Fijolek et al. | 709/220 |
| 7,272,846 B2 * | 9/2007 | Williams et al. | 725/111 |
| 2005/0050161 A1 * | 3/2005 | Arnold et al. | 709/217 |
| 2005/0114880 A1 * | 5/2005 | Gould | 725/25 |
| 2005/0228892 A1 * | 10/2005 | Riley et al. | 709/228 |
| 2006/0062209 A1 * | 3/2006 | Riley | 370/352 |
| 2007/0030860 A1 * | 2/2007 | Bekele et al. | 370/468 |
| 2007/0127468 A1 * | 6/2007 | Choi et al. | 370/389 |
| 2007/0286138 A1 * | 12/2007 | Kaftan | 370/338 |

* cited by examiner

Primary Examiner—M. Phan
(74) Attorney, Agent, or Firm—Roberts, Mardula & Wertheim, LLC

(57) ABSTRACT

A system and method for facilitating communication between a CMTS and an application sever in a cable network. Customer premises equipment (CPE) generates packets that are sent through a cable modem (CM) to a cable modem termination system (CMTS). A packet is parsed by CMTS and the destination IP address and port number compared to the destination IP address-port tuples received by the CMTS from a datastore. A packet that is directed to an IP address-port tuple on the target list (a "service request packet") is modified to incorporate CMTS-identifying information and subscriber-identifying information in the packet header. When the application server communicates with the CMTS to reserve the network resources, the application server provides the CMTS with the CM MAC and CM IP addresses to facilitate resource allocation, subscriber identification and billing.

42 Claims, 4 Drawing Sheets

SYSTEM AND METHOD FOR FACILITATING COMMUNICATION BETWEEN A CMTS AND AN APPLICATION SERVER IN A CABLE NETWORK

BACKGROUND

Embodiments hereof are directed generally to cable network topography and more specifically to the communication of identifying information by a cable modem termination system (CMTS) to an application server in a cable network.

Cable networks are increasingly providing a wide variety of disparate services to subscribers including, but not limited to, voice over IP (VoIP) services, gaming, sponsored downloads, bandwidth on demand, and other resource intensive services. These and similar services are provided by service-specific application servers that depend on subscriber-specific information and CMTS-specific information to allocate bandwidth, provide billing and assure a quality-of-service (QoS) level to the user.

Typically, a cable data network comprises a subscriber using a cable modem (CM) and a customer premises equipment (CPE) to obtain multimedia services. Packets from the CPE are passed by the CM to the CMTS. Packets that are destined for an application server are routed by the CMTS to the application server. The application server provides the requested service to the subscriber through the CMTS. The application server is responsible for application or session-level state management. The CMTS is responsible for managing a finite pool of network bandwidth and admitting requests against this pool. The application server authenticates and authorizes client requests based on policies established by the service provider. For client requests that pass these checks, the application server determines the particular QoS parameters necessary to deliver the service to the client, based on its knowledge of the requested service, and then requests these resources from the CMTS.

In order for the CMTS and the application server to perform their assigned tasks effectively, the application server must be able to identify the CMTS through which a CPE is communicating and the cable subscriber associated with the CPE. Currently, the application server accesses a datastore associating a CPE with a CMTS. This static relationship requires significant resources to establish and maintain. For example, reassignment of the CPE to a different CMTS, the addition of a subscriber, and the addition of CPE to an existing subscriber require that all datastores supporting application servers be updated with new information.

What would be useful are means for conveying information to an application server identifying the CMTS serving a CPE requesting services from the application server and associating the cable subscriber to the service request.

SUMMARY

In an embodiment, requests sent to a targeted application server from a CPE are identified at a CMTS. The request is modified to include information identifying the CMTS serving the CPE requesting services from the application server and the cable modem (CM) MAC and CM IP address through which the CPE receives data services. When the application server communicates with the CMTS to reserve the network resources required to provide the services to the requesting subscriber, the application server provides the CMTS the CM MAC and CM IP addresses to facilitate resource allocation, subscriber identification and billing. The application server is thus relieved of the task of attempting to relate subscriber-identifying information to CMTS-identifying information using a stateful, highly available datastore or a form of DHCP resolution.

In another embodiment, the CMTS maintains a list of application servers for which the service requests will be modified. In yet another embodiment, the CMTS provides the application server with the address of a trusted proxy server to which resource allocation requests are to be sent and encodes the subscriber CM MAC and CM IP addresses to provide security. This embodiment also relieves the application server of the task of relating subscriber-identifying information to CMTS-identifying information.

An application server is listed (or "targeted") based on criteria established by the cable service provider. In an embodiment, a list of targeted application servers comprises application servers that are operated by the cable service provider and operated by third parties with whom the cable service operator has established a relationship.

It is therefore an aspect hereof to facilitate the provision of advanced services over a cable network.

It is yet another aspect hereof to convey CMTS-identifying information and subscriber-identifying information to a targeted application server in a cable network.

It is still another aspect hereof to select application servers that receive CMTS and subscriber-identifying information.

It is an aspect hereof to provide an application server CMTS and subscriber-identifying information in a "soft-state" manner that does not require a stateful, highly available datastore or a form of DHCP resolution.

It is yet another aspect hereof to provide CMTS and subscriber-identifying information in a secure manner.

These and other aspects hereof will be apparent from a review of the general and detailed descriptions that follow.

In an embodiment, a CMTS receives a "target list" of 2-tuples each comprising an application server IP address and port number. When a CPE sends a packet addressed to one of the application servers identified on the target list on the appropriate port, the CMTS populates the packet header with the IP address of the interface on the CMTS through which the CPE is communicating, the CM's MAC address, and the IP address of the CM. In an embodiment, the header "PATH" field is modified to incorporate the CMTS and subscriber-identifying information. However, this is not meant as a limitation. As will be appreciated by those skilled in the art, other fields of the service request may be used to convey the CMTS and subscriber-identifying information. As will also be appreciated by those skilled in the art, additional or alternative information useful to identify the CMTS through which the CPE is communicating may be included in the header without departing from the scope hereof. For example, the gateway interface address (giaddr) of the CMTS may be used in addition to the CMTS IP address to identify the CMTS to the application server. In an alternate embodiment, the identifying information in the packet protocol is modified to include a CMTS information field.

In another embodiment, the header of the service request packet is modified to incorporate identifying information of a trusted proxy and tokens representing subscriber-identifying information. Trusted proxy-identifying information comprises the trusted proxy server IP address. Tokens representing subscriber-identifying information comprise identifiers that are associated with, or that may be used to obtain, the MAC address and the IP address of the CM through which the service request packet is sent. The trusted proxy server is adapted to resolve the tokens to reveal the CM MAC and IP address. In this embodiment, the application server may request resources from the cable network without specific knowledge of the address of the CMTS or the requesting subscriber's information.

In still another embodiment, a target list is "pushed" by the application server datastore to a CMTS. In an alternate embodiment, a target list is "pulled" by a CMTS from the application server datastore. The application server datastore is adapted to direct a specific CMTS or group of CMTSs to add, delete, or modify an entry in a target list.

As described above, the CMTS modifies packets from a CPE that are directed to one of the application servers identified on the target list. The target list may further identify whether the application server is trusted, and can receive CMTS and subscriber-identifying information in the clear, or whether the application server must receive the identifying information through a trusted proxy server.

In an embodiment, a system for facilitating communication between a CMTS and an application server over a cable network comprises an application server datastore, a CPE connected to the cable network via a cable modem, and a cable modem termination system (CMTS). The application server datastore comprises IP address-port number tuples of targeted application servers and provides these tuples to the CMTS. In an embodiment, the application server datastore "pushes" the application server IP address-port number tuples to the CMTS. In another embodiment, the CMTS "pulls" the application server IP address-port number tuples from the application server datastore.

In an embodiment, a targeted application server comprises a VoIP application server. However, this is not meant as a limitation. As will be appreciated by those skilled in the art, other targeted application servers may be identified in the application datastore without departing from the scope hereof. By way of illustration, a targeted application server may be a digital telephone application server, a game application server, a bandwidth-on-demand application server, an audio programming application server, and a video programming application server.

The cable modem (CM) comprises subscriber-identifying information. In an embodiment, subscriber-identifying information comprises a CM MAC address and a CM IP address. However, this is not meant as a limitation.

The CMTS comprises a CMTS interface and CMTS-identifying information. In an embodiment, the CMTS-identifying information comprises an IP address of the CMTS interface. However, this is not meant as a limitation. In another embodiment, the CMTS-identifying information further comprises a giaddr of the CMTS.

In an embodiment, the CPE is a computer. However this is not meant as a limitation. As will be appreciated by those skilled in the art, other CPEs may be connected to the cable modem without departing from the scope hereof. By way of illustration, the CPE may be a media terminal adapter, a VoIP-enabled telephone, a VoIP gateway, or a multimedia terminal.

A packet comprising a header comprising a destination IP address-port number tuple from the CPE is received at the CMTS interface. The CMTS determines if the destination IP address-port number tuple of the packet matches an IP address-port number tuple of a targeted application server. If the destination IP address-port number tuple of the packet matches the IP address-port number tuple of a targeted application server, then the header of the packet is modified by adding the CMTS-identifying information and the subscriber-identifying information. The CMTS sends the modified packet to the destination IP address-port number tuple.

An embodiment provides a method for facilitating communication between a CMTS and an application sever over a cable network. A cable modem termination system (CMTS) comprises CMTS-identifying information. In an embodiment, CMTS-identifying information comprises an IP address of the CMTS interface. However, this is not meant as a limitation. In another embodiment, the CMTS-identifying information further comprises a giaddr of the CMTS.

The CMTS receives IP address-port number tuples of targeted application servers from an application server datastore. In an embodiment, the IP address-port number tuples of targeted application servers are "pushed" from an application server datastore to a CMTS. In an alternate embodiment, the IP address-port number tuples of targeted application servers are "pulled" by the CMTS from the application server datastore.

A packet from a CPE is received at a CMTS interface via a cable modem, wherein the packet comprises a header comprising a destination IP address-port number tuple and wherein the cable modem comprises subscriber-identifying information. In an embodiment, subscriber-identifying information comprises a CM MAC address and a CM IP address. However, this is not meant as a limitation.

A determination is made whether the destination IP address-port number tuple of the packet matches an IP address-port number tuple of a targeted application server. If the destination IP address-port number tuple of the packet matches the IP address-port number tuple of the targeted application server, then the header of the packet is modified by adding the CMTS-identifying information and the subscriber-identifying information. The modified packet is sent to the destination IP address-port number tuple, thereby facilitating the provisioning of the application server to the subscriber from the targeted application server.

In an embodiment, a system for facilitating communication between a CMTS and an application sever over a cable network comprises an application server datastore, a CPE connected to the cable network via a cable modem, a trusted proxy server, and a cable modem termination system (CMTS). The application server datastore comprises IP address-port number tuples of targeted application servers and provides these tuples to the CMTS. In an embodiment, the application server datastore "pushes" the application server IP address-port number tuples to the CMTS. In another embodiment, the CMTS "pulls" the application server IP address-port number tuples from the application server datastore.

In an embodiment, a targeted application server comprises a VoIP server. However, this is not meant as a limitation. As will be appreciated by those skilled in the art, other targeted application servers may be identified in the application datastore without departing from the scope hereof. By way of illustration, a targeted application server may be a digital telephone application server, a game application server, a bandwidth-on-demand application server, an audio programming application server, and a video programming application server.

The cable modem (CM) comprises subscriber-identifying information. In an embodiment, subscriber-identifying information comprises a MAC address token representing the MAC address of the cable modem and an IP address token representing the IP address of the cable modem. By way of illustration and not as a limitation, a MAC address token may be ciphertext produced by applying an encryption algorithm to the CM MAC address, a hash value produced by applying a hash algorithm to the CM MAC address, or a database location where the CM MAC address is stored. Similarly, the IP address token may be a ciphertext produced by applying an encryption algorithm to the CM IP address, a hash value produced by applying a hash algorithm to the CM IP address, or a database location where the CM IP address is stored.

The CMTS comprises a CMTS interface and CMTS-identifying information. In an embodiment, the CMTS-identifying information comprises an IP address of the CMTS interface. However this is not meant as a limitation. In another embodiment, the CMTS-identifying information further comprises a giaddr of the CMTS.

In an embodiment, the CPE is a computer. However, this is not meant as a limitation. As will be appreciated by those skilled in the art, other CPEs may be connected to the cable modem without departing from the scope hereof. By way of illustration, the CPE may be a media terminal adapter, a VoIP-enabled telephone, a VoIP gateway, or a multimedia terminal.

In an embodiment, the trusted proxy server comprises proxy-identifying information. By way of illustration and not as a limitation, proxy-identifying information comprises an IP address of the trusted proxy server.

A packet comprising a header comprising a destination IP address-port number tuple from the CPE is received at the CMTS interface. The CMTS determines if the destination IP address-port number tuple of the packet matches an IP address-port number tuple of a targeted application server. If the destination IP address-port number tuple of the packet matches the IP address-port number tuple of a targeted application server, then the header of the packet is modified by adding the proxy-identifying information and the subscriber-identifying information. The CMTS sends the modified packet to the destination IP address-port number tuple.

DETAILED DESCRIPTION

Figure 1:
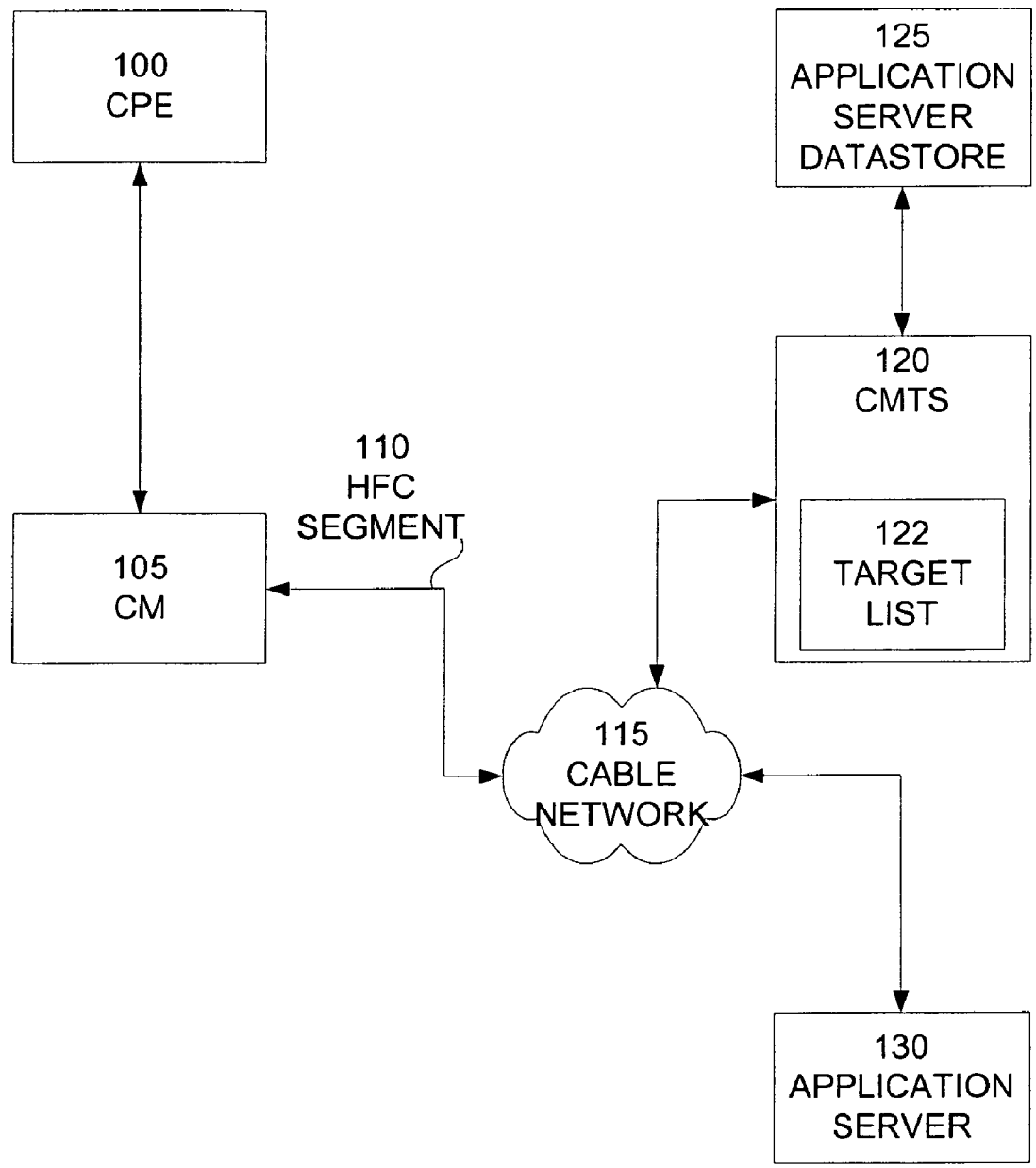
FIG. 1 illustrates a block diagram of a cable network utilizing an application server datastore according to an embodiment.

The description that follows utilizes a number of terms the definitions of which are provided below for the sake of clarity and comprehension:

Application Server An application server is responsible for application or session-level state management. The application server typically authenticates and authorizes client requests based on policies established by the service provider. For client requests that pass these checks, the application server determines the particular QoS parameters necessary to deliver the service to the client, based on its knowledge of the requested service. It then sends a request for these resources to the CMTS for admission control and enforcement.

CM A cable modem.

CMTS A cable modem termination system (CMTS). The CMTS is responsible for allocating and scheduling upstream and downstream bandwidth in accordance with MTA requests and QoS authorizations established by the network administrator.

CPE Customer premises equipment. giaddr The gateway interface address of a CMTS.

MTA A multimedia terminal adapter. The MTA may be an embedded with a cable modem or may be a standalone device that connects to a cable modem via an external interface.

In an embodiment, a CMTS receives a "target list" of 2-tuples each comprising an application server IP address and port number. When a CPE sends a packet addressed to one of the application servers identified on the target list on the appropriate port, the CMTS populates the packet header with the IP address of the interface on the CMTS through which the CPE is communicating, the CM's MAC address, and the IP address of the CM. In an embodiment, the header "PATH" field is modified to incorporate the CMTS and subscriber-identifying information. However, this is not meant as a limitation. As will be appreciated by those skilled in the art, other fields of the service request may be used to convey the CMTS and subscriber-identifying information. As will also be appreciated by those skilled in the art, additional or alternative information useful to identify the CMTS through which the CPE is communicating may be included in the header without departing from the scope hereof. For example, the giaddr of the CMTS may be used in addition to the CMTS IP address to identify the CMTS to the application server. In an alternate embodiment, the identifying information of the packet protocol is modified to include a CMTS information field.

In another embodiment, the header of the service request packet is modified to incorporate identifying information of a trusted proxy server and tokens representing subscriber-identifying information. Trusted proxy-identifying information comprises the trusted proxy server IP address. Tokens representing subscriber-identifying information comprise identifiers that are associated with, or that may be used to obtain, the MAC address and the IP address of the CM through which the service request packet is sent. The trusted proxy server is adapted to resolve the tokens to reveal the CM MAC and IP address. In this embodiment, the application server may request resources from the cable network without specific knowledge of the address of the CMTS or the requesting subscriber's information.

FIG. 1 illustrates a block diagram of a cable network utilizing an application server datastore according to an embodiment. CPE 100 is connected to CM 105 and to network 115 via a hybrid fiber coax (HFC) segment 110. CM 105 communicates with CMTS 120 via cable network 115. CMTS 120 is linked to application server datastore 125 and communicates with application server 130 via cable network 115. Application server 130 may be connected directly to cable network 115 or may be connected to a separate network (not illustrated) that is accessible to cable network 115 via an interface (not illustrated) as is well known in the art.

Application server datastore comprises 2-tuples each comprising an application server IP address and port number. The CMTS 120 receives the target list 122 from the application server datastore 125. In an embodiment, the target list 122 is "pushed" to the CMTS 120. In an alternate embodiment, the target list 122 is "pulled" by the CMTS 120 from the application server datastore 125.

CPE 100 generates packets that are sent through CM 105 to CMTS 120 via HFC segment 110 and cable network 115. A packet is parsed by CMTS 120 and the destination IP address and port number are compared to the IP address-port tuples on the target list 122. A packet that is directed to an IP address-port tuple on the target list 122 (a "service request packet") is modified to incorporate CMTS-identifying information and subscriber-identifying information in the packet header. In an embodiment, the CMTS and subscriber-identifying information are added to the PATH field of the service request packet. However, this is not meant as a limitation. As will be appreciated by those skilled in the art, other fields may be used to convey the identifying information.

In an embodiment, CMTS-identifying information comprises the CMTS IP address. Subscriber-identifying information comprises the MAC address and the IP address of the CM through which the service request packet is sent. As will be appreciated by those skilled in the art, identifying information may include additional attributes of the CMTS and/or the subscriber without departing from the scope hereof. By way of illustration, the CMTS-identifying information may further comprise the giaddr.

Figure 2:
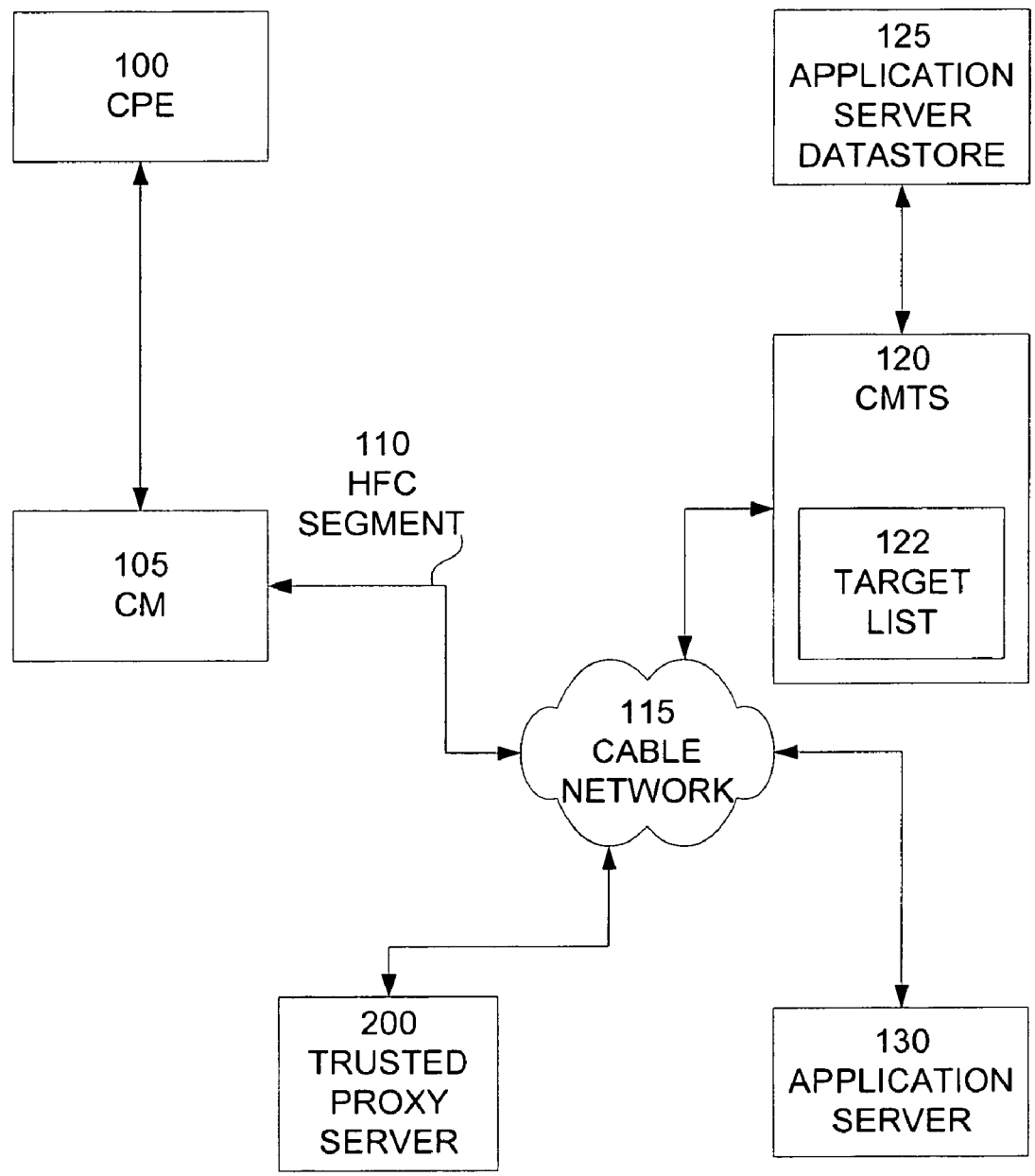
FIG. 2 illustrates a block diagram of a cable network utilizing an application server datastore and a trusted proxy server according to an embodiment.

FIG. 2 illustrates a block diagram of a cable network utilizing an application server datastore and a trusted proxy server according to an embodiment. In this embodiment, if a packet is directed to an IP address-port tuple on the target list 122, the packet header is modified to incorporate identifying information of a trusted proxy server 200 and tokens representing subscriber-identifying information.

Trusted proxy-identifying information comprises the trusted proxy server 200 IP address. Tokens representing subscriber-identifying information comprise identifiers that are associated with, or that may be used to obtain, the MAC address and the IP address of the CM through which the service request packet is sent. By way of illustration and not as a limitation, a MAC token may be ciphertext produced by applying an encryption algorithm to the CM MAC address, a hash value produced by applying a hash algorithm to the CM MAC address, or a database location where the CM MAC address is stored. Similarly, an IP address token may be ciphertext produced by applying an encryption algorithm to the CM IP address, a hash value produced by applying a hash algorithm to the CM IP address, or a database locator where the CM IP address is stored.

The trusted proxy server 200 is adapted to resolve the tokens to reveal the CM MAC and IP address. In this embodiment, the application server 130 may request resources from the cable network 115 without specific knowledge of the address of the CMTS 120 or the requesting subscriber's identifying information.

Figure 3:
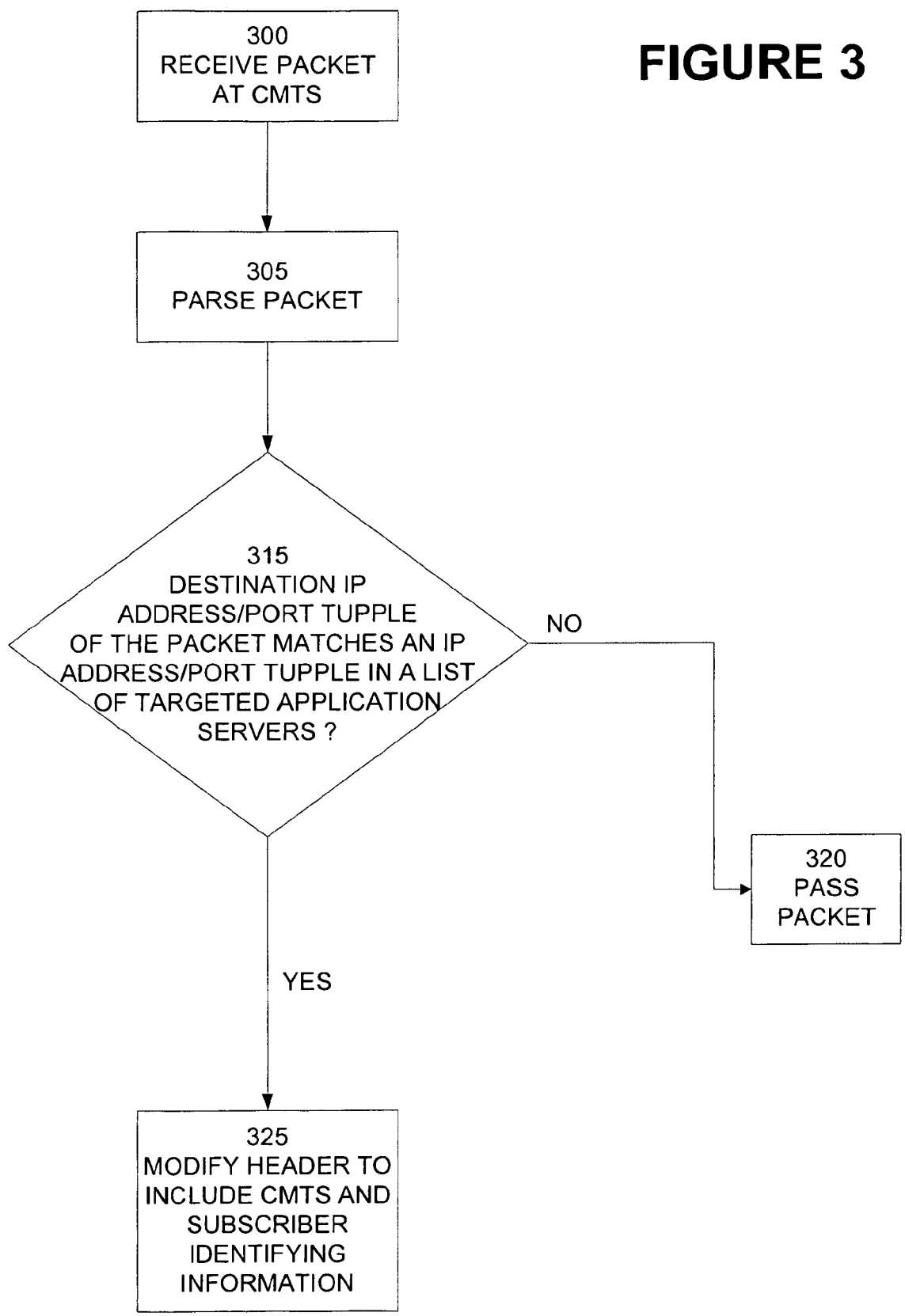
FIG. 3 illustrates a process by which a service request packet directed to a targeted application server is identified and modified according to an embodiment.

FIG. 3 illustrates a process by which a service request packet directed to a targeted application server is identified and modified according to an embodiment. Referring to FIG. 3, a packet is received at the CMTS from a CM 300. The packet is generated by a CPE. By way of illustration and not as a limitation, the packet may be generated by a computer, a multimedia terminal, a VoIP telephone, a VoIP gateway, or an MTA. The packet is parsed and the destination IP address and port are extracted 305. A determination is made whether the destination IP address-port tuple of the packet matches an IP address-port tuple in a list of targeted application servers 315. If the destination address-port tuple of the packet does not match an IP address-port tuple on the list of the targeted application servers, the CMTS passes the packet to the network 320.

If the destination address-port tuple of the packet matches an IP address-port tuple on the list of the targeted application servers, the packet is identified as a service request packet, and the CMTS modifies the header of the service request packet to include CMTS and subscriber-identifying information 325.

In an embodiment, CMTS-identifying information comprises the CMTS IP address and subscriber-identifying information comprises the MAC address and the IP address of the CM through which the service request packet is sent. As will be appreciated by those skilled in the art, identifying information may include additional attributes of the CMTS and/or the subscriber without departing from the scope. By way of illustration, the CMTS-identifying information may further comprise the giaddr.

In another embodiment, the header of the service request packet is modified to incorporate identifying information of a trusted proxy and tokens representing subscriber-identifying information. Trusted proxy-identifying information comprises the trusted proxy server IP address. Tokens representing subscriber-identifying information comprise identifiers that are associated with, or that may be used to obtain, the MAC address and the IP address of the CM through which the service request packet is sent. By way of illustration and not as a limitation, a MAC token may be ciphertext produced by applying an encryption algorithm to the CM MAC address, a hash value produced by applying a hash algorithm to the CM MAC address, or a database location where the CM MAC address is stored. Similarly, an IP address token may be ciphertext produced by applying an encryption algorithm to the CM IP address, a hash value produced by applying a hash algorithm to the CM IP address, or a database locator where the CM IP address is stored.

The application server directs a response to a service request to the trusted proxy server, which forwards the response to the originating CMTS. In this way, the application server may communicate with CMTS without receiving the CMTS-identifying information or the subscriber information from the CMTS.

Figure 4:
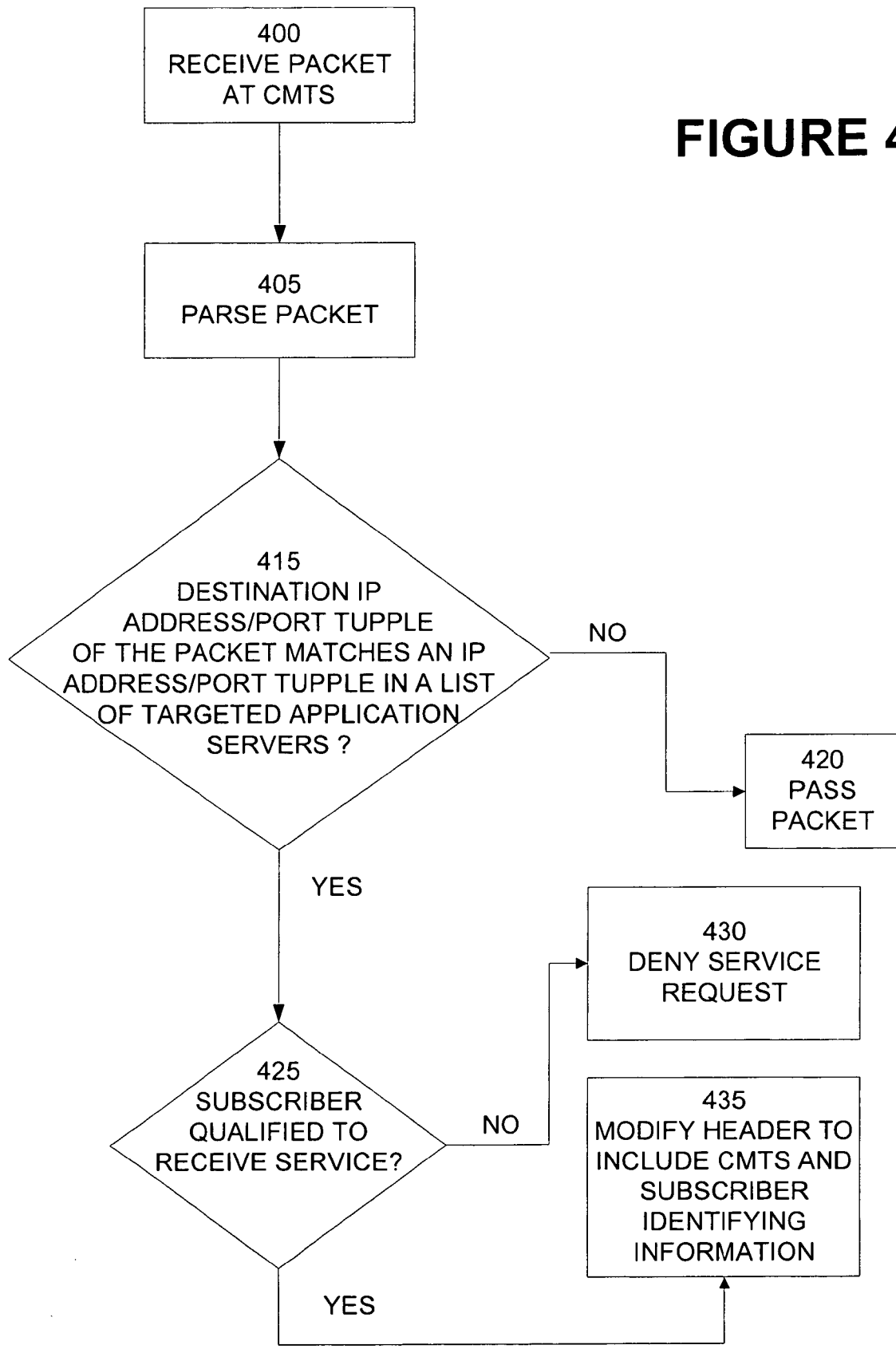
FIG. 4 illustrates a process in which a CMTS qualifies a subscriber for a service using the content of a service request according to an embodiment.

In an embodiment, when the CMTS receives a service request from a subscriber, the CMTS determines whether the subscriber is entitled to use the requested service. FIG. 4 illustrates a process in which a CMTS qualifies a subscriber for a service using the content of a service request according to an embodiment.

Referring to FIG. 4, a packet is received at the CMTS from a CM 400. The packet is generated by a CPE. By way of illustration and not as a limitation, the packet may be generated by a computer, a multimedia terminal, a VoIP telephone, a VoIP gateway, or an MTA. The packet is parsed and the destination IP address and port are extracted 405. A determination is made whether the destination IP address-port tuple of the packet matches an IP address-port tuple in a list of targeted application servers 415. If the destination address-port tuple of the packet does not match an IP address-port tuple on the list of the targeted application servers, the CMTS passes the packet to the network 420.

If the destination address-port tuple of the packet matches an IP address-port tuple on the list of the targeted application servers, the CMTS determines whether the subscriber is qualified to receive the service requested 425. In an embodiment, the CMTS uses the subscriber-identifying information to determine what services a subscriber is entitled to receive. Entitlement in this context comprises determining whether a subscriber has subscribed to a particular service and whether the subscriber has met conditions to receive the particular service. For example, a subscriber's access to a service may have been suspended for failure to make payment for services previously rendered. If the subscriber is not entitled to receive a service, the service request is denied 430. In an embodiment, the CMTS sends the subscriber a message indicating the reasons for denying the service request.

If the subscriber qualifies for the service requested, the CMTS modifies the header of the service request packet to include CMTS and subscriber-identifying information 440.

It will be understood by those skilled in the art that the present invention may be embodied in other specific forms without departing from the scope of the invention disclosed and that the examples and embodiments described herein are in all respects illustrative and not restrictive. Those skilled in the art will recognize that other embodiments using the concepts described herein are also possible. Further, any reference to claim elements in the singular, for example, using the articles "a," "an," or "the," is not to be construed as limiting the element to the singular.

What is claimed is:

1. A system for facilitating communication between a CMTS and an application server in a cable network comprising:
    an application server datastore, wherein the application server datastore comprises IP address-port number tuples of targeted application servers;
    a customer premises equipment (CPE) connected to the cable network via a cable modem, wherein the cable modem (CM) comprises subscriber-identifying information; and
    a cable modem termination system (CMTS) comprising a CMTS interface and CMTS-identifying information, wherein the CMTS comprises instructions for:
        receiving IP address-port number tuples of the targeted application servers from the application server datastore;
        receiving at the CMTS interface a packet from the CPE, wherein the packet comprises a header comprising a destination IP address-port number tuple;
        determining if the destination IP address-port number tuple of the packet matches an IP address-port number tuple of a targeted application server; and
        if the destination IP address-port number tuple of the packet matches the IP address-port number tuple of a targeted application server, then:
            modifying the header of the packet by adding the CMTS-identifying information and the subscriber-identifying information; and
            sending the modified packet to the destination IP address-port number tuple.

2. The system of claim 1, wherein the application server datastore comprises instructions for pushing the application server IP address-port number tuples to the CMTS.

3. The system of claim 1, wherein the CMTS further comprises instructions for pulling the application server IP address-port number tuples from the application server datastore.

4. The system of claim 1, wherein the CPE is selected from the group consisting of a computer, a media terminal adapter, a VoIP-enabled telephone, a VoIP gateway, and a multimedia terminal.

5. The system of claim 1, wherein the targeted application server is selected from a group consisting of a VoIP application server, a digital telephone application server, a game application server, a bandwidth-on-demand application server, an audio programming application server, and a video programming application server.

6. The system of claim 1, wherein subscriber-identifying information comprises a CM MAC address and a CM IP address.

7. The system of claim 1, wherein the CMTS-identifying information comprises an IP address of the CMTS interface.

8. The system of claim 7, wherein the CMTS-identifying information further comprises a gateway interface address (giaddr) of the CMTS.

9. A method for facilitating communication between a CMTS and an application server in a cable network:
    receiving at a cable modem termination system (CMTS) IP address-port number tuples of targeted application servers from an application server datastore, wherein the CMTS comprises CMTS-identifying information;
    receiving at a CMTS interface a packet from a customer premises equipment (CPE) via a cable modem, wherein the packet comprises a header comprising a destination IP address-port number tuple and wherein the cable modem comprises subscriber-identifying information;
    determining if the destination IP address-port number tuple of the packet matches an IP address-port number tuple of a targeted application server; and
    if the destination IP address-port number tuple of the packet matches the IP address-port number tuple of the targeted application server, then:
        modifying the header of the packet by adding the CMTS-identifying information and the subscriber-identifying information; and
        sending the modified packet to the destination IP address-port number tuple.

10. The method for facilitating communication between a CMTS and an application server over a cable network of claim 9, wherein receiving at a cable modem termination system (CMTS) address-port number tuples of targeted application servers from an application server datastore comprises pulling the IP address-port number tuples of targeted application servers from an application server datastore to the CMTS.

11. The method for facilitating communication between a CMTS and an application server over a cable network of claim 9, wherein receiving at a cable modem termination system (CMTS) address-port number tuples of targeted application servers from an application server datastore comprises pushing the IP address-port number tuples of targeted application servers from an application server datastore to the CMTS.

12. The method for facilitating communication between a CMTS and an application server over a cable network of claim 9, wherein the CPE is selected from the group consisting of a computer, a media terminal adapter, a VoIP-enabled telephone, a VoIP gateway, and a multimedia terminal.

13. The method for facilitating communication between a CMTS and an application server over a cable network of claim 9, wherein the targeted application server is selected from the group consisting of a VoIP application server, a digital telephone application server, a game application server, a bandwidth-on-demand application server, an audio programming application server, and a video programming application server.

14. The method for facilitating communication between a CMTS and an application server over a cable network of claim 9, wherein subscriber-identifying information comprises a CM MAC address and a CM IP address.

15. The method for facilitating communication between a CMTS and an application server over a cable network of claim 9, wherein the CMTS-identifying information comprises an IP address of the CMTS interface.

16. The method for facilitating communication between a CMTS and an application server over a cable network of claim 15, wherein the CMTS-identifying information further comprises a gateway interface address (giaddr) of the CMTS.

17. A system for facilitating communication between a CMTS and an application server over a cable network comprising:
- an application server datastore, wherein the application server datastore comprises IP address-port number tuples of targeted application servers;
- a customer premises equipment (CPE) connected to the cable network via a cable modem, wherein the cable modem comprises subscriber-identifying information;
- a trusted proxy server comprising proxy-identifying information; and
- a cable modem termination system (CMTS) comprising a CMTS interface and instructions for:
    - receiving IP address-port number tuples of the targeted application servers from the application server datastore;
    - receiving at the CMTS interface a packet from the CPE, wherein the packet comprises a header comprising a destination IP address-port number tuple;
    - determining if the destination IP address-port number tuple of the packet matches an IP address-port number tuple of a targeted application server;
    - if the destination IP address-port number tuple of the packet matches the IP address-port number tuple of the targeted application server, then:
        - modifying the header of the packet by adding the proxy-identifying information and the subscriber-identifying, information; and
        - sending the modified packet to the destination IP address-port number tuple.

18. The system of claim 17, wherein the application server datastore comprises instructions for pushing the application server IP address-port number tuples to the CMTS.

19. The system of claim 17, wherein the CMTS further comprises instructions for pulling the application server IP address-port number tuples from the application server datastore.

20. The system of claim 17, wherein the CPE is selected from the group consisting of a computer, a media terminal adapter, a VoIP-enabled telephone, a VoIP gateway, and a multimedia terminal.

21. The system of claim 17, wherein the targeted application server is selected from the group consisting of a VoIP application server, a digital telephone application server, a game application server, a bandwidth-on-demand application server, an audio programming application server, and a video programming application server.

22. The system of claim 17, wherein the proxy-identifying information comprises an IP address of the trusted proxy server.

23. The system of claim 17, wherein the subscriber-identifying information comprises a MAC address token representing the MAC address of the cable modem, and an IP address token representing the IP address of the cable modem.

24. The system of claim 23, wherein the MAC address token is selected from the group consisting of ciphertext produced by applying an encryption algorithm to the CM MAC address, a hash value produced by applying a hash algorithm to the CM MAC address, and a database location where the CM MAC address is stored.

25. The system of claim 23, wherein the IP address token is selected from the group consisting of ciphertext produced by applying an encryption algorithm to the CM IP address, a hash value produced by applying a hash algorithm to the CM IP address, and a database location where the CM IP address is stored.

26. A method for facilitating communication between a CMTS and an application server over a cable network comprising:
- receiving at a cable modem termination system (CMTS) IP address-port number tuples of targeted application servers from an application server datastore, wherein the CMTS comprises CMTS-identifying information;
- receiving at a CMTS interface a packet from a customer premises equipment (CPE) via a cable modem, wherein the packet comprises a header comprising a destination IP address-port number tuple and wherein the cable modem comprises subscriber-identifying information;
- determining if the destination IP address-port number tuple of the packet matches an IP address-port number tuple of a targeted application server; and
- if the destination IP address-port number tuple of the packet matches the IP address-port number tuple of the targeted application server, then:
    - modifying the header of the packet by adding proxy-identifying information of a trusted proxy server and the subscriber-identifying information; and
    - sending the modified packet to the destination IP address-port number tuple.

27. The method of claim 26, wherein the application server datastore comprises instructions for pushing the application server IP address-port number tuples to the CMTS.

28. The method of claim 26, wherein the CMTS further comprises instructions for pulling the application server IP address-port number tuples from the application server datastore.

29. The method of claim 26, wherein the CPE is selected from the group consisting of a computer, a media terminal adapter, a VoIP-enabled telephone, a VoIP gateway, and a multimedia terminal.

30. The method of claim 26, wherein the targeted application server is selected from the group consisting of a VoIP application server, a digital telephone application server, a game application server, a bandwidth-on-demand application server, an audio programming application server, and a video programming application server.

31. The method of claim 26, wherein the proxy-identifying information comprises an IP address of the trusted proxy server.

32. The method of claim 26, wherein the subscriber-identifying information comprises a MAC address token representing the MAC address of the cable modem and an IP address token representing the IP address of the cable modem.

33. The method of claim 32, wherein the MAC address token is selected from the group consisting of ciphertext produced by applying an encryption algorithm to the CM MAC address, a hash value produced by applying a hash algorithm to the CM MAC address, and a database location where the CM MAC address is stored.

34. The method of claim 32, wherein the IP address token is selected from the group consisting of ciphertext produced by applying an encryption algorithm to the CM IP address, a hash value produced by applying a hash algorithm to the CM IP address, and a database location where the CM IP address is stored.

35. The system of claim 1 wherein the CMTS further comprises instructions for:
- if the destination IP address-port number tuple of the packet matches the IP address-port number tuple of a targeted application server, then determining whether a subscriber associated with the subscriber-identifying information is qualified to communicate with the target;

if the subscriber is not qualified to communicate with the targeted application server, then rejecting the packet; and
if the subscriber is qualified to communicate with the targeted application server, then:
modifying the header of the packet by adding the CMTS-identifying information and the subscriber-identifying information; and
sending the modified packet to the destination IP address-port number tuple.

36. The system of claim 35, wherein the instruction for determining whether the subscriber is qualified to communicate with the targeted application server comprises determining whether a subscriber has subscribed to a particular service and whether the subscriber has met conditions to receive the particular service.

37. The method for facilitating communication between a CMTS and an application server over a cable network of claim 9 further comprising:
if the destination IP address-port number tuple of the packet matches the IP address-port number tuple of a targeted application server, then determining whether a subscriber associated with the subscriber-identifying information is qualified to communicate with the target;
if the subscriber is not qualified to communicate with the targeted application server, then rejecting the packet; and
if the subscriber is qualified to communicate with the targeted application server, then:
modifying the header of the packet by adding the CMTS-identifying information and the subscriber-identifying information; and
sending the modified packet to the destination IP address-port number tuple.

38. The method for facilitating communication between a CMTS and an application server over a cable network of claim 37, wherein determining whether the subscriber is qualified to communicate with the targeted application server comprises determining whether a subscriber has subscribed to a particular service and whether the subscriber has met conditions to receive the particular service.

39. The system of claim 17 wherein the CMTS further comprises instructions for:
if the destination IP address-port number tuple of the packet matches the IP address-port number tuple of a targeted application server, then determining whether a subscriber associated with the subscriber-identifying information is qualified to communicate with the target;
if the subscriber is not qualified to communicate with the targeted application server, then rejecting the packet; and
if the subscriber is qualified to communicate with the targeted application server, then:
modifying the header of the packet by adding the proxy-identifying information and the subscriber-identifying information; and
sending the modified packet to the destination IP address-port number tuple.

40. The system of claim 39, wherein the instruction for determining whether the subscriber is qualified to communicate with the targeted application server comprises determining whether a subscriber has subscribed to a particular service and whether the subscriber has met conditions to receive the particular service.

41. The method for facilitating communication between a CMTS and an application server over a cable network of claim 26 further comprising:
if the destination IP address-port number tuple of the packet matches the IP address-port number tuple of a targeted application server, then determining whether a subscriber associated with the subscriber-identifying information is qualified to communicate with the target;
if the subscriber is not qualified to communicate with the targeted application server, then rejecting the packet; and
if the subscriber is qualified to communicate with the targeted application server, then:
modifying the header of the packet by adding the proxy-identifying information and the subscriber-identifying information; and
sending the modified packet to the destination IP address-port number tuple.

42. The method for facilitating communication between a CMTS and an application server over a cable network of claim 41, wherein determining whether the subscriber is qualified to communicate with the targeted application server comprises determining whether a subscriber has subscribed to a particular service and whether the subscriber has met conditions to receive the particular service.

* * * * *